United States Patent [19]

Lawrence et al.

[11] Patent Number: 4,924,489
[45] Date of Patent: May 8, 1990

[54] CUSTOMER LINE TESTER

[75] Inventors: Peter J. Lawrence, Felixstowe; David W. Pring, Stowupland, both of England.

[73] Assignee: British Telecommunications public limited company, United Kingdom

[21] Appl. No.: 333,921

[22] Filed: Apr. 6, 1989

[30] Foreign Application Priority Data

Apr. 12, 1988 [GB] United Kingdom ............... 8808623

[51] Int. Cl.⁵ .............................................. H04B 3/46
[52] U.S. Cl. ........................................ 379/6; 379/24; 379/29
[58] Field of Search .................... 379/6, 21, 24, 29, 27, 379/30

[56] References Cited

U.S. PATENT DOCUMENTS

| | | | |
|---|---|---|---|
| 3,920,935 | 11/1975 | Vierling et al. | 179/175.3 R |
| 4,467,148 | 8/1984 | Stafford et al. | 179/175.3 R |
| 4,558,188 | 12/1985 | Stuparits | 179/175.2 D |

FOREIGN PATENT DOCUMENTS

| | | |
|---|---|---|
| 2001722 | 7/1971 | Fed. Rep. of Germany. |
| 3444872 | 6/1986 | Fed. Rep. of Germany. |
| 2121549 | 12/1983 | United Kingdom. |

*Primary Examiner*—Stafford D. Schreyer
*Attorney, Agent, or Firm*—Nixon & Vanderhye

[57] ABSTRACT

Apparatus is described for testing a telephone line between a customer's telephone and a local exchange associated therewith. The apparatus comprises a field unit positioned between the customer's telephone and the line, an exchange unit positioned at the exchange, and a microcomputer associated with the field unit for controlling operation of the field unit and the exchange unit. The field unit and the exchange unit each have means for transmitting frequency tones down the line and means for measuring the voltage across the line. The microcomputer is programmed to calculate the loudness rating of the line from the measured voltage values.

21 Claims, 3 Drawing Sheets

CUSTOMER LINE TESTER

This invention relates to apparatus for, and a method of, measuring the transmission loss performance of a telephone line connecting a customer's telephone apparatus to a local exchange.

The transmission loss performance of a telephone connection (line) is often thought of as the loss between the points where the telephone apparatuses are connected at either end of the line. This loss is usually measured, in dBs, by means of an oscillator connected at one end of the line, and a level measuring set connected at the other end of the line. Although such loss measurements are useful in tracing faults or testing circuits, they do not give a complete picture of the customer's opinion because they do not include the electrical and acoustic losses of the telephone apparatus.

Thus, a known method of testing a customer's line utilises a simple tone test (usually a mid-frequency tone such as 1600 Hz). In practice, the known method requires two telephone lines, one line for testing and one line for control. Alternatively, two people are required, one at the customer's apparatus and one at the local exchange, and careful synchronisation is essential. In either case, the known method is difficult to administer, and is not applicable to all customer lines. Moreover, as only one frequency is tested, the known method gives no information regarding other frequencies, at which problems may be present.

A loss measurement that takes account of all the acoustic and electrical losses that comprise the connection between the two users would be more representative of the customer's perceived view of the transmission loss performance of the connection. Such a loss measurement is called a loudness rating.

The aim of the invention is to provide a customer line tester which uses only a single telephone line, which is easier to use than known apparatus, and which gives a more comprehensive test result than known apparatus.

The present invention provides apparatus for testing a telephone line between a customer's telephone and a local exchange associated therewith, the apparatus comprising a field unit positionable between the customer's telephone and the line, an exchange unit positionable at the exchange, and control means associated with the field unit for controlling operation of the field unit and the exchange unit, wherein the field unit and the exchange unit each have means for transmitting frequency tones down the line and means for measuring the voltage across the line, and the control means include means for calculating the loudness rating of the line from the measured voltage values.

Advantageously, the transmission means of each of the units comprises a synthesiser adapted to produce a plurality of frequency tones.

Conveniently, a respective filter and amplitude detector constitutes the voltage measuring means of each unit.

Advantageously, the control means is effective to instruct the synthesiser of the field unit to send a plurality of frequency tones to the filter and amplitude detector of the exchange unit for measurement of the line voltage at each frequency, to instruct the synthesiser of the exchange unit to send a plurality of frequency tones to the filter and amplitude detector of the field unit for measurement of the line voltage at each frequency, to instruct the exchange unit to send the voltage values measured by its filter and amplitude detector to the field unit, and to calculate the loudness rating of the line from said measured voltage values. Preferably, the control means is effective to set the filter and amplitude detector of each of the units to each of the frequency tones in turn when the synthesiser of the other unit is sending frequency tones.

In a preferred embodiment, the control means further includes means for calculating the echo loss of the line. Conveniently, the means is effective to instruct the field unit to connect an impedance across the line, to instruct the synthesiser of the field unit to send a plurality of frequency tones to the exchange unit, to set the filter and amplitude detector of the exchange unit to each of the frequency tones in turn, to instruct the filter and amplitude detector of the exchange unit to measure the voltage across the line at each of the said frequencies, to instruct the exchange unit to send the measured voltage values to the field unit, and to calculate the echo loss of the line from said measured voltage values.

The control means may further include means for calculating the round trip delay on the telephone line. In this case the apparatus may further comprise an oscilloscope associated with the field unit, and wherein the control means is such as to send a predetermined pulse waveform over the telephone line, whereby the round trip delay can be determined by measuring the time between the incident and reflected pulses shown on the oscilloscope.

The invention also provides a method of testing a telephone line between a customer's telephone and a local exchange associated therewith, the method comprising the steps of transmitting a plurality of frequency tones down the line from a master unit at one end of the line to a slave unit at the other end of the line, using the slave unit to measure the voltage across the line at each of said frequencies, transmitting a plurality of frequency tones from the slave unit to the master unit, using the master unit to measure the voltage across the line of each of said frequencies, transmitting the measured voltage values from the slave unit to the master unit, and using the measured voltage values to calculate the loudness rating for the line.

Advantageously the method further comprises the steps of connecting an impedance across the line, transmitting the plurality of frequency tones down the line from the master unit to the slave unit, using the slave unit to measure the voltage across the line at each of said frequencies, transmitting the measured voltage values from the slave unit to the master unit, and using the measured voltage values to calculate the echo loss of the line.

Preferably, the method further comprises the steps of sending a predetermined pulse waveform over the telephone line from the master unit to the slave unit and back to the master unit, and measuring the round trip delay of the line by measuring the time between the incident and reflected pulses shown on an oscilloscope associated with the master unit.

A customer line tester constructed in accordance with the invention will now be described in detail, by way of example, with reference to the accompanying drawings, in which.

Figure 1:
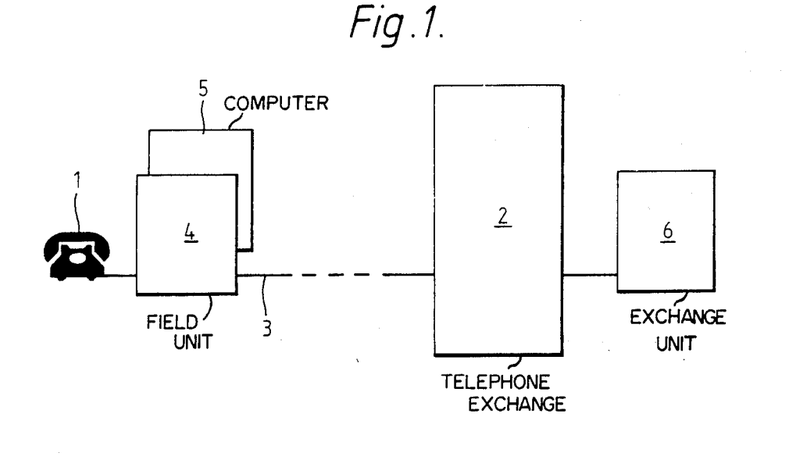
FIG. 1 is a block schematic representation of the tester.

Referring to the drawings, FIG. 1 shows the customer line tester together with a customer's telephone apparatus 1, the local exchange 2 associated therewith, and a line 3 connecting the telephone apparatus to the local exchange. The tester is constituted by a field unit 4, a Merlin 5180 portable computer 5 for controlling the field unit, and an exchange unit 6, the exchange unit being controlled by a single board computer card (not shown).

When making tests within the local network, the tester's separate units 4 and 6 are connected at each end of the network. In this instance, the local network is between the customer's line jack socket and the far side of the transmission bridge for an analogue exchange, and the far side of the codec for a digital exchange. In reality, the exchange unit 6 cannot be located at this reference point in the exchange 2, but on the end of another line in the exchange. This line can be considered for all purposes as having a negligible effect. Account can then be taken, for example in a digital exchange, of the gains and losses of the line card to make all calculations refer to the reference point.

The local connection (line) 3 is whatever exists between the telephone 1 and the local exchange 2, be it a Private Branch Exchange (PBX) or anything else. When the tester is used with a Telepone Exchange Digital (TDX) exchange it may be connected to either a four-wire line to perform delay, echo loss and loudness rating tests, or a two-wire line to perform loudness rating tests only. When used with all other exchange types, the tester can only be connected to a two-wire line to perform loudness rating tests.

The computer 5 has two disc drives, drive A for receiving an applications disc, and drive B for receiving a results disc. The applications disc contains program software and data files for all commonly-used telephones. The program software controls the tester, and leads the user sequentially through the various test options.

Figure 3:
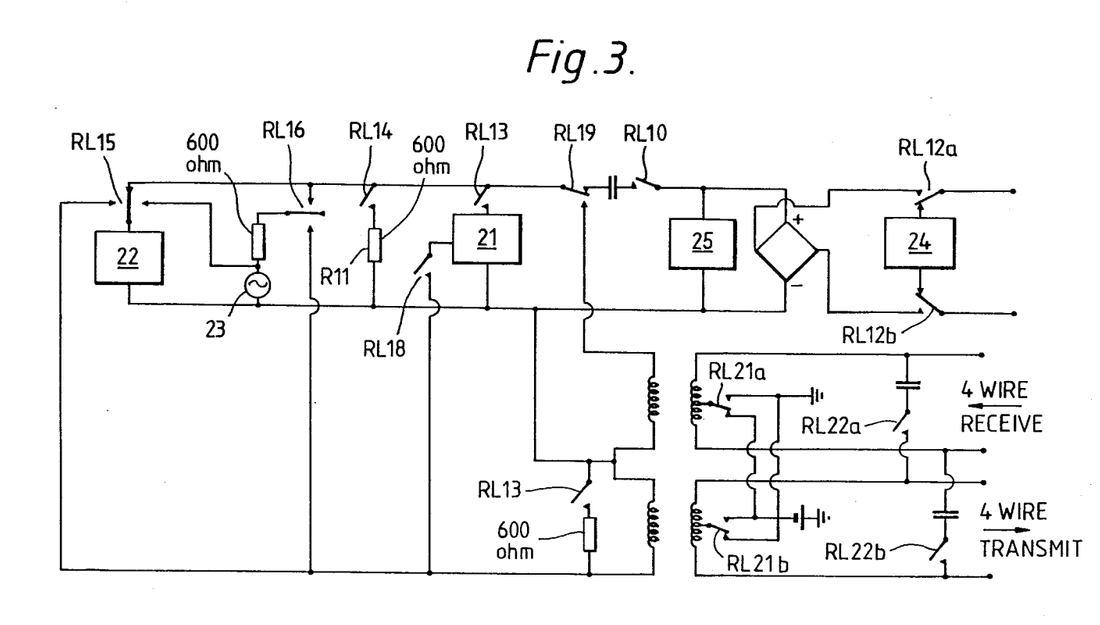
FIG. 3 is a block circuit diagram of the exchange unit of the tester.

As mentioned above, the exchange unit 6 can be connected for two-wire operation (for use with analogue and digital exchanges) or for four-wire operation (for use with digital exchanges). The circuit layout of the exchange unit 6, which is shown in FIG. 3 illustrates these two alternative operational modes.

The prime function of the tester is to measure the "loudness rating" of a customer's line. The term "loudness rating" describes the transmission loss performance of an end-to-end connection, and takes into account the different losses and frequency responses of the interconnecting circuits. For telecommunications planning purposes, a connection's Overall Loudness Rating (OLR) consists of its Send Loudness Rating (SLR), its Receiver Loudness Rating (RLR), and the combined loss of the elements forming the connection between the SLR and RLR references points. When the exchange unit 6 is situated in the local exchange 2, the SLR and RLR of the connection (line 3) can be measured by the field unit 4 when it has been connected at the customer's premises.

When the line tester is used to measure a connection's loudness rating, it also provides an indication of the telephone instrument "side tone" value. Side tone is the term used to describe the receipt of speech by the user from the telephone's receiver when the user speaks into the microphone. The receipt of side tone by the user makes the telephone instrument seem operative, although the amount of side tone received may influence the user's perception of the transmission loss performance of the connection. Too much side tone tends to cause the user to speak quieter, or to hold the telephone handset further away from the mouth, resulting in a possible decrease in the received speech at the listener's telephone. When the side tone is too high, the background noise observed by the user can be enhanced to an undesirable level, resulting in the received speech being masked, and possibly appearing faint to the customer. This problem has been encountered with some digital PBX installations. Too little side tone can cause the telephone user to speak too loudly, resulting in the distant customer's discomfort.

This side tone level, for a telephone instrument, is quoted in dB referenced to an agreed international side tone reference standard. The Side Tone Masking Rating (STMR) is the value of side tone observed for a telephone instrument compares to the international side tone reference standard.

When the line tester is used to provide an indication of a connection's SLR, RLR and STMR, the 'insertion loss' of the connection is also provided. This can be considered to be the loss presented (in dB) by the connection between the points of connection of the field unit 4 and the exchange unit 6. When the tester displays a connection's insertion loss, it is referenced to an impedance of 600 ohms and an impedance that is dependant upon the telephone instrument being emulated.

A loudness rating test can be made with the exchange unit 6 connected to a two-wire or a four-wire line. After connecting up the field unit 2, and switching on, the user will be led through the test, being offered options as necessary. These are responded to with a single keystroke of the computer 5. The following steps should then be carried out:

1. The applications disc is inserted into drive A and the results disc is inserted into drive B of the computer 5.
2. The field unit 4, and then the computer 5 are turned on.
3. The program will boot up into the tester program and display the date and time. The question 'Is this correct, enter y or n' is displayed. Entering 'n' will allow the date and time to be modified under the program's prompting. 'y' is entered if the date and time are correct.
4. A prompt is given to connect the field unit 4 to the telephone 1 and the line 3.
5. This main menu is then displayed:
   A. Do a transmission test
   B. View the directory of result files
   C. View a result file
   D. Print a result file
   E. Delete a result file
   Z. Quit tester
6. 'a' or 'A' is pressed to do the loudness rating test.
7. Every time on power up and before a transmission test is run, the tester will go through a self-calibration routine at this point.
8. The exchange unit 6 should then be called. When it answers, a 1 kHz tone from its modem 21 (see FIG. 3) will be heard. Any key of the computer 5 should then be pressed. To prevent the call being dropped by the tester, this should be done within one minute of the call being established. The two units 4 and 6 of the tester will then communicate with each other.

9. The type of line/exchange to which the exchange unit 6 is connected is displayed.

10a. When there is a four-wire connection at the exchange unit 6, calibration values that have to be taken into account in the calculations are transferred to the field unit 4. The values are obtained once per connection at this point in the sequence. As there are several tests that can be made with the exchange unit 6 connected to a four-wire line, the following Transmission Tests menu is displayed when this configuration is present:

A. Loudness Ratings Test
B. Echo Loss Test
C. Delay Test
Z. Go back to previous menu 'a' or 'A' is pressed to do the loudness rating test.

10b. When there is a two-wire connection at the exchange unit 6, the program moves the test sequence to step 11.

11. A telephone type is choosen from the menu displayed. This is normally the telephone type, or one similar, that is connected to the field unit 4.

12. The dc conditions at the telephone terminals are then measured.

13. The line noise at the telephone is measured with a psophometrically weighted filter.

14. The connection (line) 3 is measured at 14 discrete frequencies in each direction.

15. All the values measured by the exchange unit 6 are then transferred to the field unit 4.

16. With a digital exchange and some PBXs, there is no transmission at the top test frequency of 4 kHz. A message to this effect will be displayed when this occurs. If there is no transmission at other frequencies, that is also displayed at this point.

17. Characteristics of the connection are calculated and a results table displayed in the format of the table below, which is merely exemplary to illustrate the format of results.

| Line current = 56.0 mA Line voltage = 11.6 V Line noise = 59 dBmP | | | | | |
|---|---|---|---|---|---|
| freq | Line Z | | 600 Lins | 600 Linr | Lins | Linr |
| Hz | Mod | arg | dB | dB | dB | dB |
| 200 | 1125 | −32 | 3.1 | 3.1 | 2.5 | 2.4 |
| 250 | 1010 | −29 | 2.8 | 2.7 | 2.4 | 2.3 |
| 315 | 928 | −27 | 2.6 | 2.6 | 2.4 | 2.3 |
| 400 | 878 | −24 | 2.5 | 2.4 | 2.4 | 2.3 |
| 500 | 852 | −22 | 2.4 | 2.3 | 2.4 | 2.3 |
| 630 | 828 | −21 | 2.3 | 2.3 | 2.4 | 2.4 |
| 800 | 836 | −22 | 2.2 | 2.2 | 2.4 | 2.4 |
| 1000 | 790 | −23 | 2.3 | 2.3 | 2.6 | 2.6 |
| 1250 | 765 | −25 | 2.4 | 2.3 | 2.8 | 2.7 |
| 1600 | 728 | −29 | 2.4 | 2.4 | 3.0 | 2.9 |
| 2000 | 686 | −33 | 2.6 | 2.5 | 3.2 | 3.2 |
| 2500 | 636 | −37 | 2.8 | 2.7 | 3.5 | 3.4 |
| 3150 | 571 | −42 | 3.1 | 3.1 | 3.7 | 3.7 |
| 4000 | 498 | −46 | 3.6 | 3.6 | 4.3 | 4.3 |

SLR = 2.7, RLR = 3.8, STMR = 10.9

Where:

Line current and Line voltage are the current and voltage measured at the telephone terminals.

Line noise is the psophometrically weighted line noise.

freq lists the frequencies at which the measurements and subsequently the calculations are made.

Line Z is the line impedance seen by the telephone 1 looking towards the telephone exchange 2.

600 Lins & 600 Linr are the measured insertion losses for the connection in a 600 ohms environment (note: when used with TXD exchange these are the losses to the 0 dBr point).

Lins & Linr are the insertion losses between exchange unit 6 and the field unit 4 referenced to the telephone impedance and 600 ohms.

SLR is the send loudness rating.
RLR is the receive loudness rating.
STMR is the sidetone masking rating.

Figure 2:
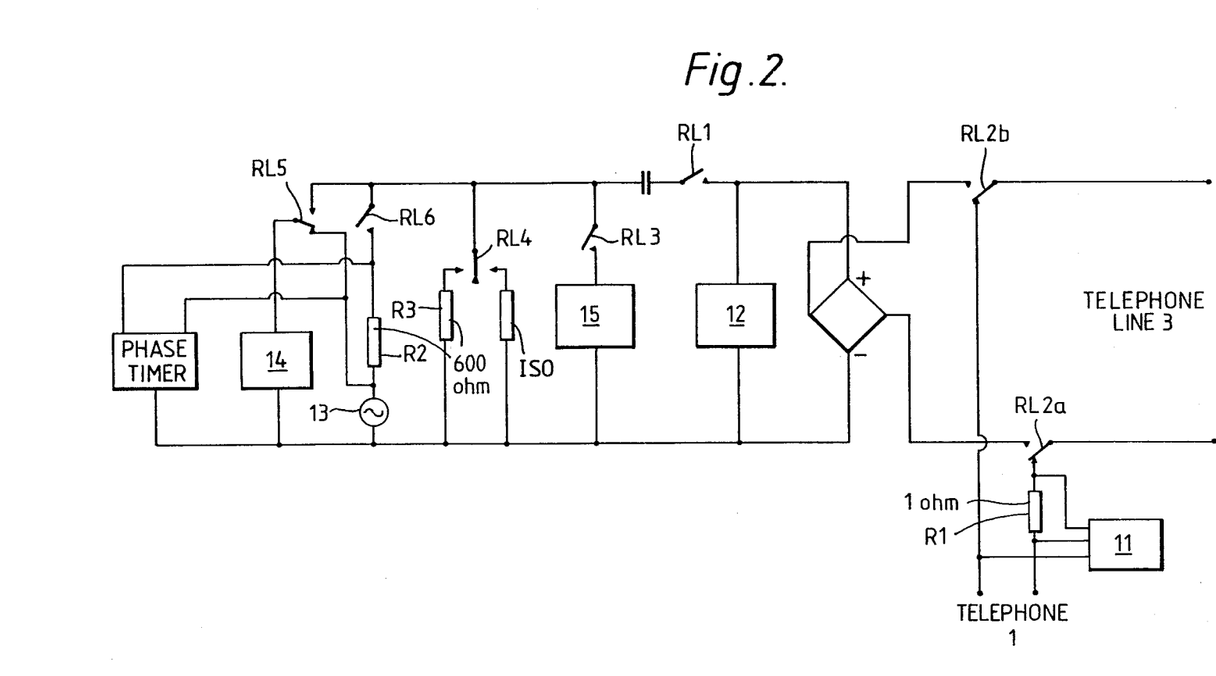
FIG. 2 is a block circuit diagram of the field unit of the tester.

The actual measurements carried out during the loudness rating test will now be described in greater detail with reference to FIGS. 2 and 3. The first thing to be done is to measure the dc conditions at the customer's telephone 1 using the field unit 4. The voltage across the telephone line 3 and then, so as to determine the line current, the voltage across a 1 ohm resistor R1, in series with the telephone, are measured by a DC measurement unit 11 including op-amps and an analogue/digital convertor. The correct block of data for the line conditions and the operating characteristics of the customer's telephone is obtained from the relevant telephone data file. Also, the line hold 12 is set so that the dc resistance of the telephone 1 is mimicked by the field unit 4. The relays RL1 and RL2 are then operated, connecting the tester to line. The field unit 4 tells the exchange unit 6 to receive a frequency sweep, and then tells it that it will send it the first frequency. The exchange unit 6 connects a 600 ohm termination R11, across the line by operating relay RL14. The field unit 4 sets its synthesiser 13 and filter/detector 14 to the correct frequency, and connects the synthesiser to the line 3 via relay RL6. The filter/detector 14 measures the voltage from the synthesiser 13 (with the relay RL5 off), the voltage across the line (with the relay RL5 on), and the phase across a 600 ohm resistor R2 associated with the synthesiser 13. The exchange unit 6 sets its filter/detector 22 to the correct frequency, and measures the level on the line via relay RL15. The modem 15 of the field unit 4 is then put on line via relay RL3, and the modem 21 of the exchange unit 6 is put on line via relay RL13. This is repeated for the 14 different frequencies in turn.

The field unit 4 then tells the exchange unit 6 to send a frequency sweep, and then tells it to send the first frequency. The field unit 4 connects a 600 ohm termination R3 across the line via relay RL4. The exchange unit 6 sets its synthesiser 23 and filter/detector 22 to the correct frequency, and connects them to line via relays RL15 and RL16. It measures the voltage across the line. The field unit 4 then sets its filter/detector 14 to the correct frequency, and measures the level on the line with the relay RL5 on. Both units 4 and 6 then put their modems 15 and 21 respectively on line. This is repeated for the 14 frequencies in turn.

The field unit 4 then tells the exchange unit 6 to send the values it measured, and then calculates line impedance, insertion losses, and loudness ratings.

When the exchange unit 6 is set for connection to a four-wire line, relays RL18 and RL19 operate. The exchange unit 6 firstly measures the loss across its line transformers. Values are measured for each of the 14 frequencies. When the exchange unit 6 is set for connection to a two-wire line, relays RL18 and RL19 are not operated. Normally, the exchange unit 6 is looking at its telephone line for an incoming call. If in two-wire mode, it looks for ringing with its ring detector 24. if in four-wire mode, it looks for current being drawn from its line voltage feeding circuit. When the exchange unit 6 finds a call, in two-wire mode, it connects its line hold 25 via relay RL12; and, in four-wire mode, it reverses the polarity of the line feeding voltage via relay RL21. It connects its modem 21 to line via relay RL13, and looks for the 'sign-on' message from the field unit 4. It is necessary for the field unit 4 to communicate with the exchange unit 6 every 30 seconds or so to keep the call established and prevent the exchange unit clearing down.

When the line tester is used in its four-wire mode it is able to offer the user the facility to measure a connection's echo loss, stability loss or round trip delay. The concepts of these quantities, and their effect upon the customer's opinion of a connection's transmission performance, will now be outlined.

One-Way Delay and End Delay

Signals that are to be conveyed from the one end to the other end of a telephone connection experience a finite time delay as they travel through the interconnecting circuits forming the telephone connection between the users. This time delay is referred to as the connection's one-way delay.

The addition of a connection's one-way delay value in both directions of transmission gives the connection's round trip delay. When the line tester is used in its four-wire mode, the round trip delay between a Customer's telephone and the point of connection of the exchange unit 6 may be measured as is described below.

Echo and Echo Loss

The transmission of signals between one end and the other end of a telephone connection will experience one-way delay; and, as the one-way delay in each direction of transmission within the connection (round trip delay) increases, then speech "echoes" may be perceived by the customer who is talking (talker echo). When the round trip delay has an insignificantly small value, talker echo adds to the customer's telephone apparatus side tone value. Longer round trip delay may allow talker echo to be observable by the customer.

Digital connections, and longer distance connections through the analogue network, separate the directions of transmission, to allow for the regeneration of, or the amplification of, the signals that are to be transmitted. Two-wire to four-wire conversion circuits are used to provide four-wire working on such routes.

Talker echo occurs when speech signals are reflected back to the talker from distant two-wire to four-wire conversion circuits. The subjective effect upon the talker is determined by the level of the speech echo, along with the time delay for the speech echo to be returned to the talker (round trip delay). This time delay (round trip delay) will be composed of the one-way delay up to the point where the speech signal is reflected, and the one-way delay within the path back to the talker. When the round trip delay is less than a few milliseconds, then the speech echo increases the customer telephone apparatus side tone; but, as the end delay value increases, the speech echo becomes distinct from the side tone, and can become disturbing to the talker.

Talker echo is normally controlled by ensuring that the receive-to-transmit loss introduced by a two-wire to four-wire conversion circuit is adequate to attenuate any echo signal to a level where it is not subjectively disturbing to the user. Echo loss is defined as the weighted loss value observed at the "equi-reference level" point, and for the British Telecom network this reference point is normally the 0 dBr point.

Stability and Stability loss

A four-wire circuit is considered to be stable if it can reliably convey information between telephone users, without entering into a state of oscillation, and maintain a state of equilibrium during the time it is not in use but still in a state of activation.

A four-wire circuit can be prevented from entering into a state of oscillation if sufficient loss is maintained across the two-wire to four-wire conversion circuit's four-wire termination. This loss is called "stability loss" and is measured, at a 0 dBr four-wire reference point, in the frequency range 0–4 KHz between the receive and transmit four-wire terminations with any impedance terminating the two wire.

As mentioned above, the tester can be used to carry out echo loss, stability loss and delay tests. The first two of these tests are carried out in the following manner:

An echo loss test can be made only if the exchange unit 6 is connected to a four-wire analogue junction on a digital exchange. After connecting up the field unit 6 and switching on, the user will be led through the test, being offered options as necessary. These are responded to with a single keystroke of computer 5. The following test sequence will then occur:

1. The applications disc is inserted into drive A and the results disc is inserted into drive B of the compuer 5.
2. The tester and then the computer 5 are turned on.
3. The program will boot up into the tester program and display the date and time. The question "Is this correct, enter y or n" is displayed. Entering 'n' will allow the date and time to be modified under the program's prompting. 'y' is entered if the date and time are correct.
4. A prompt is given to connect the field unit 4 to the telephone 1 and the line 3.
5. This main menu is then displayed:
   A. Do a transmission test
   B. View the directory of result files
   C. View a result file
   D. Print a result file
   E. Delete a result file
   Z. Quit tester
6. 'a' or 'A' is pressed to do the echo loss test.
7. Every time on power up and before a transmission test is run, the tester will go through a self-calibration routine at this point.
8. The exchange unit 6 should then be called. When it answers, a 1 kHz tone from its modem 21 will be heard. Any key of the computer 5 should then be pressed. To prevent the call being dropped by the tester, this should be done within one minute of the call being established. The two units 4 and 6 of the tester will then communicate with each other.
9. The type of line/exchange to which the exchange unit is connected is displayed. Calibration values that have to be taken into account in the calculations are transferred to the field unit 4. These values are obtained once per connection at this point in the sequence.
10. The following Transmission Tests menu is then displayed:
    A. Loudness Ratings Test
    B. Echo Loss Test C. Delay Test
Z. Go back to previous menu
11. 'b' or 'B' is pressed to do the echo loss test.
12. A menu for the termination that is placed across the line at the field unit 4 is given:
   A. 600 ohms
   B. Complex Impedance (BS6305)
   C. Telephone
13. The 600 ohm and the BS 6305 complex impedance terminations are internally provided. If the telephone 1 is chosen as the termination, it should be arranged so that it is in a quiet location with its handset resting on a non-reflecting surface such as a cushion. When this choice is made, the test must be made with care as room noise or coupling of the tones from the handset receiver to transmitter will cause the results to be inaccurate.
14. The connection is measured at 14 frequencies by the exchange unit 6.
15. All the values measured by the exchange unit 6 are transferred to the field unit 4.
16. The loss and echo loss of the connection are calculated and displayed in the format of the following table, which is merely exemplary to illustrate the format of results.

| freq Hz | Loss | dB |
| --- | --- | --- |
| 200 | 22.0 | |
| 250 | 22.7 | |
| 315 | 23.2 | |
| 400 | 23.1 | |
| 500 | 23.9 | |
| 630 | 23.6 | |
| 800 | 24.6 | |
| 1000 | 23.4 | |
| 1250 | 23.1 | |
| 1600 | 22.5 | |
| 2000 | 21.4 | |
| 2500 | 20.1 | |
| 3150 | 18.9 | |
| 4000 | 17.5 | |
| Echo Loss = 23.3 dB | | |
| Stability Loss with 600 ohm termination = 17.5 dB | | |

An option to store the results on the results disc is then given.
17. The following menu is displayed:
   A. (Repeat) transmission test on this connection
   B. View the directory of result files
   C. View a result file
   D. Drop this connection
   This test is then complete, but an option is given to hold this connection for a repeat test. If another test on the same connection is not required then pressing 'd' or 'D' will cause the call to be dropped, and the program to go back to the main menu.

The actual measurements carried out during the echo loss test will now be described in greater detail with reference to FIGS. 2 and 3. Firstly, the field unit 4 tells the exchange unit 6 to do an echo loss sweep, and then tells it the first frequency to use. The field unit 4 connects the chosen termination across the line 3. The exchange unit 6 sets its synthesiser 23 and filter/detector 22 to the correct frequency, and connects them to the line 3 via relays RL15 and RL16. With its filter/detector 22 it measures the voltage sent to the line 3 (via relay RL15) and that received back from line 3 (via relay RL15). Both units 4 and 6 then put their modems 15 and 21 respectively on line. This is repeated for the 14 frequencies in turn.

The field unit 4 tells the exchange unit 6 to send the values it measured, and then calculates the loss at each frequency, and then the echo loss.

The delay test is carried out in the following manner:

A delay test can only be made if the exchange unit 6 is connected to a four-wire analogue junction on a digital exchange. After connecting up the field unit 4 and switching on, the user will be led through the test, being offered options as necessary. These are responded to with a single keystroke of the computer 5. Although the line tester generates the incident pulse for this test, the returned pulse must be viewed, and the delay measured, on an electrically-isolated oscilloscope (not shown). A dual outlet adaptor is plugged into the customer's jack socket. Both the field unit 4 and the line socket test plug are connected to this. The electrically-isolated oscilloscope is connected to pins 2 and 5 of the line socket test plug.

The following test sequence will then occur:
1. The applications disc is inserted into drive A and the results disc is inserted into drive B of the computer 5.
2. The tester and then the computer 5 are turned on.
3. The program will boot up into the tester program and display the date and time. The question "Is this correct, enter y or n" is displayed. Entering 'n' will allow the date and time to be modified under the program's prompting. 'y' is entered if the date and time are correct.
4. A prompt is given to connect the field unit 4 to the telephone 1 and the line 3. The dual outlet adaptor is put into the customer's jack socket, and the field unit 4 is connected to one socket and the test plug to the other. The oscilloscope is connected across pins 2 and 5 of the test plug.
5. This main menu is then displayed:
   A. Do a transmission test
   B. View the directory of result files
   C. View a result file
   D. Print a result file
   E. Delete a result file
   Z. Quit tester
6. 'a' or 'A' is pressed to do the delay test.
7. Every time on power up and before a transmission test is run, the tester will go through a self-calibration routine at this point.
8. The exchange unit 6 should then be called. When it answers, a 1 kHz tone from its modem 21 will be heard. Any key of the computer 5 should then be pressed. To prevent the call being dropped by the tester, this should be done within one minute of the call being established. The two units 4 and 6 of the tester will then communicate with each other.
9. The type of line/exchange to which the exchange unit is connected is displayed. Calibration values that have to be taken into account in the calculations are transferred to the field unit 4. These values are obtained once per connection at this point in the sequence.
10. The following Transmission Tests menu is then displayed:
    A. Loudness Ratings Test
    B. Echo Loss Test
    C. Delay Test
    Z. Go back to previous menu
11. 'c' or 'C' is pressed to do the delay test.

Figure 4:
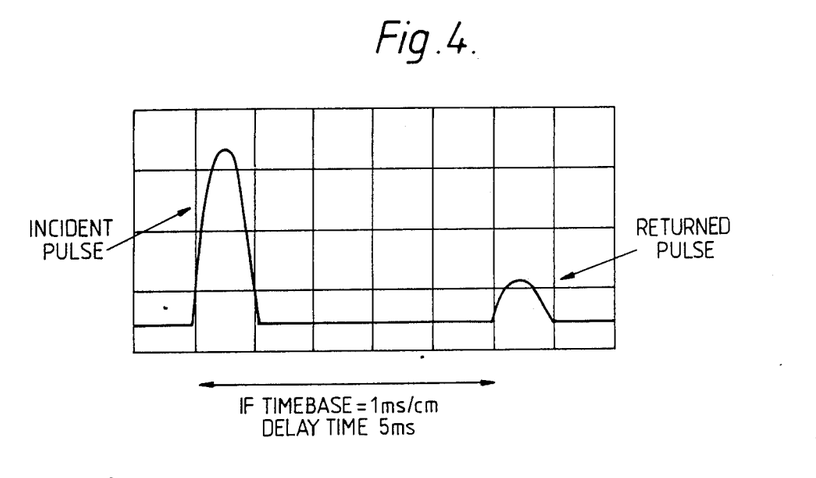
FIG. 4 illustrates a delay waveform (as viewed on an oscilloscope) which is used in a delay test.

12. The following pulse waveform menu is then displayed:
   A. 0.5 v pulse every 10 ms
   B. 0.75 v pulse every 10 ms
   C. 0.5 v pulse every 30 ms
   D. 0.75 v pulse every 30 ms
   E. 0.5 v pulse every 50 ms
   F. 0.75 v pulse every 50 ms
13. The three repetition rates allow for a variation in delay time in the network being measured. Initially a 0.5 v pulse with the longest repetition rate should be chosen. If the delay is subsequently found to be less than one of the other repetition rates, it should be selected. High loss connections may require a 0.75 v pulse for additional clarity. The letter that corresponds to the pulse waveform required should be entered by pressing the appropriate key on the computer 5.
14. A message is displayed which sets 'Press any key to end test—there may be up to 30 seconds delay before a response to this'. With this test the field unit 4 generates a repetitive pulse for 30 seconds, after which it sends a modem message to the exchange unit 6 to confirm the connection is still held. It then continues sending the pulse.
15. The oscilloscope is adjusted until a display is seen of the type shown in FIG. 4. An indication of the customer's round trip delay is given by observing the time between the incident and reflected pulses.

At the end of a loudness rating or echo loss test, the results can be recorded in a file on a disc in drive B. This makes a character file than can be printed out or examined at some other time. The directory of the results files already stored and their contents can also be viewed.

At the completion of a loudness ratings or echo loss test, the question 'Store test results in a file or disc?, enter y or n' is displayed. Pressing 'y' will enter a sequence where details of the connection and the results will be stored on the results disc in drive B under a file name chosen by the user.

I claim:

1. Apparatus for testing a telephone line between a customer's telephone and a local exchange associated therewith, the apparatus comprising:
   a field unit positionable between the customer's telephone and the line,
   an exchange unit positionable at the exchange, and
   control means including means for calculating associated with the field unit for controlling operation of the field unit and the exchange unit,
   wherein the field unit and the exchange unit each have means for transmitting a plurality of frequency tones down the line and means for measuring the voltage across the line, and
   wherein the control means is effective to instruct the field unit to send a plurality of frequency tones to the exchange unit for measurement of the line voltage at each frequency, to instruct the exchange unit to send a plurality of frequency tones to the field unit for measurement of the line voltage at each frequency, to instruct the exchange unit to send the voltage values measured thereby to the field unit, and to calculate the loudness rating of the line from the measured voltage values.

2. Apparatus as claimed in claim 1, wherein the transmission means of each of the units comprises a synthesiser adapted to produce a plurality of frequency tones.

3. Apparatus as claimed in claim 2, wherein each of the synthesisers is adapted to produce 14 standard frequency tones.

4. Apparatus as claimed in claim 2, wherein the transmission means of each unit further comprises a modem.

5. Apparatus as claimed in claim 2, wherein a respective filter and amplitude detector constitutes the voltage measuring means of each unit.

6. Apparatus as claimed in claim 5, wherein the control means is effective to set each of the filter and amplitude detectors to a desired frequency prior to that detector measuring the voltage across the line.

7. Apparatus as claimed in claim 6, wherein the control means is effective to instruct the synthesiser of the field unit to send a plurality of frequency tones to the filter and amplitude detector of the exchange unit for measurement of the line voltage at each frequency, to instruct the synthesiser of the exchange unit to send a plurality of frequency tones to the filter and amplitude detector of the field unit for measurement of the line voltage at each frequency, to instruct the exchange unit to send the voltage values measured by its filter and amplitude detector to the field unit, and to calculate the loudness rating of the line from said measured voltage values.

8. Apparatus as claimed in claim 7, wherein the control means is effective to set the filter and amplitude detector of each of the units to each of the frequency tones in turn when the synthesiser of the other unit is sending frequency tones.

9. Apparatus for testing a telephone line between a customer's telephone and a local exchange associated therewith, the apparatus comprising:
   a field unit positionable between the customer's telephone and the line,
   an exchange unit positionable at the exchange, and
   control means associated with the field unit for controlling operation of the field unit and the exchange unit,
   wherein the field unit and the exchange unit each have synthesiser means for transmitting frequency tones down the line and means including a filter and amplitude detector for measuring the voltage across the line, and
   the control means is effective to set each of the filter and amplitude detectors to a desired frequency prior to that detector means measuring the voltage across the line and
   the control means include means for calculating the loudness rating of the line from the measured voltage and further includes means for calculating the echo loss of the line.

10. Apparatus as claimed in claim 9, wherein the control means is effective to instruct the field unit to connect an impedance across the line, to instruct the synthesiser of the field unit to send a plurality of frequency tones to the exchange unit, to set the filter and amplitude detector of the exchange unit to each of the frequency tones in turn, to instruct the filter and amplitude detector of the exchange unit to measure the voltage across the line at each of the said frequencies, to instruct the exchange unit to send the measured voltage values to the field unit, and to evaluate the echo loss of the line from said measured voltage values.

11. Apparatus for testing a telephone line between a customer's telephone and a local exchange associated therewith, the apparatus comprising:

a field unit positionable between the customer's telephone and the line, an exchange unit positionable at the exchange, and control means associated with the field unit for controlling operation of the field unit and the exchange unit, wherein the field unit and the exchange unit each have synthesiser means for transmitting frequency tones down the line and means including a filter and amplitude detector for measuring the voltage across the line, and the control means is effective to set each of the filter and amplitude detectors to a desired frequency prior to that detector means measuring the voltage across the line and the control means include means for calculating the loudness rating of the line from the measured voltage and further includes means for calculating the round trip delay on the telephone line.

12. Apparatus as claimed in claim 11, further comprising an oscilloscope associated with the field unit, and wherein the control means is such as to send a predetermined pulse waveform over the telephone line, whereby the rund trip delay can be determined by measuring the time between the incident and reflected pulses shown on the oscilloscope.

13. Apparatus for testing a telephone line between a customer's telephone and a local exchange associated therewith, the apparatus comprising:

a field unit positionable between the customer's telephone and the line, an exchange unit positionable at the exchange, and control means associated with the field unit for controlling operation of the field unit and the exchange unit, wherein the field unit and the exchange unit each have means for transmitting frequency tones down the line and means for measuring the voltage across the line, the control means include means for calculating the loudness rating of the line from the measured voltage values and wherein a microcomputer constitutes the control means.

14. Apparatus as claimed in claim 13, wherein the microcomputer is programmed to access data files containing blocks of data relating to the operating characteristics of each of a predetermined number of telephones.

15. A method of testing a telephone line between a customer's telephone and a local exchange associated therewith, the method comprising the steps of:

transmitting a plurality of frequency tones down the line from a master unit at one end of the line to a slave unit at the other end of the line, using the slave unit to measure the voltage across the line at each of said frequencies, transmitting a plurality of frequency tones from the slave unit to the master unit, using the master unit to measure the voltage across the line at each of said frequencies, transmitting each of the measured voltage values from the slave unit to the master unit, and using the measured voltage values to calculate the loudness rating for the line.

16. A method of testing a telephone line between a customer's telephone and a local exchange associated therewith, the method comprising the steps of:

transmitting a plurality of frequency tones down the line from a master unit at one end of the line to a slave unit at the other end of the line, using the slave unit to measure the voltage across the line at each of said frequencies, transmitting a plurality of frequency tones from the slave unit to the master unit, using the master unit to measure the voltage across the line at each of said frequencies, transmitting each of the measured voltage values from the slave unit to the master unit, using the measured voltage values to calculate the loudness rating for the line, connecting an impedance across the line, transmitting a plurality of frequency tones down the line from the master unit to the slave unit, using the slave unit to measure the voltage across the line at each of said frequencies, transmitting the measured voltage values from the slave unit to the master unit, and using the measured voltage values to calculate the echo loss of the line.

17. A method of testing a telephone line between a customer's telephone and a local exchange associated therewith, the method comprising the steps of:

transmitting a plurality of frequency tones down the line from a master unit at one end of the line to a slave unit at the other end of the line, using the slave unit to measure the voltage across the line at each of said frequencies, transmitting a plurality of frequency tones from the slave unit to the master unit, using the master unit to measure the voltage across the line at each of said frequencies, transmitting each of the measured voltage values from the slave unit to the master unit, using the measured voltage values to calculate the loudness rating for the line, sending a predetermined pulse waveform over the telephone line from the master unit to the slave unit and back to the master unit, and measuring the round trip delay of the line by measuring the time between the incident and reflected pulses shown on an oscilloscope associated with the master unit.

18. A method of testing a telephone line between a customer's telephone and a local exchange associated therewith, the method comprising the steps of:

transmitting a plurality of frequency tones down the line from a master unit at one end of the line to a slave unit at the other end of the line, using the slave unit to measure the voltage across the line at each of said frequencies, transmitting a plurality of frequency tones from the slave unit to the master unit, using the master unit to measure the voltage across the line at each of said frequencies, transmitting each of the measured voltage values from the slave unit to the master unit, using the measured voltage values to calculate the loudness rating for the line, using a microcomputer to access data files containing blocks of data relating to the operating characteristics of a predetermined number of telephones, retrieving data appropriate for the customer's telephone, and using this data in the calculation of the loudness rating for the line.

19. Apparatus for testing a telephone line between a telephone and a local exchange associated therewith, the apparatus comprising:
first means connected between the telephone and said line for transmitting a plurality of frequency tones on the line and for measuring the line voltage at each frequency,
second means connected to the local exchange for transmitting a plurality of frequency tones on said line and for measuring the line voltage at each frequency,
third means for controlling said first means to transmit said plurality of frequency tones and causing said second means to measure the line voltage at each frequency and for controlling said second means to transmit said plurality of frequency tones and causing said first means to measure the line voltage in response thereto, and for controlling the second means to transmit the voltage values measured thereby to said first means, said third means including means for calculating the loudness rating of said line from the measured line voltages.

20. Apparatus according to claim 19, wherein said third means includes means for calculating the echo loss of the line.

21. Apparatus according to claim 20, wherein said third means is a microcomputer.

* * * * *